United States Patent [19]
Babled

[11] 3,868,002
[45] Feb. 25, 1975

[54] BRAKE MEMBERS AND SHOES AND SHOE SUPPORTS FOR SUCH MEMBERS, ESPECIALLY FOR TWO-WHEELED VEHICLES

[76] Inventor: Raymond Babled, 72 Avenue d'Orgeval, 95 Saint-Gratien, France

[22] Filed: Oct. 1, 1973

[21] Appl. No.: 402,309

[30] Foreign Application Priority Data
Oct. 3, 1972 France .......................... 72.34987

[52] U.S. Cl............. 188/73.1, 188/243, 188/250 B
[51] Int. Cl. .............................................. F16d 69/04
[58] Field of Search....... 188/73.1, 242, 243, 250 B, 188/24

[56] References Cited
UNITED STATES PATENTS
1,465,975   8/1923   Emery................................. 188/243

FOREIGN PATENTS OR APPLICATIONS
326,361   2/1903   France ................................... 188/24
126,660   12/1901   Germany ............................. 188/24
667,156   2/1952   Great Britain ....................... 188/24

Primary Examiner—George E. A. Halvosa
Attorney, Agent, or Firm—Larson, Taylor & Hinds

[57] ABSTRACT

The brake member comprises a brake shoe, a shoe support and a connecting rod between the shoe and the support. The shoe has a head for introduction and immobilization in the support. An opening through the head receives the connecting rod. The support is rigidly fixed to brake actuating means and the frictional surface of the brake shoe is applied against the rim of the wheel. There are at least two lateral facing surfaces on the support including at least one opening bound by a complete perimeter, for receiving the connecting rod.

7 Claims, 3 Drawing Figures

BRAKE MEMBERS AND SHOES AND SHOE SUPPORTS FOR SUCH MEMBERS, ESPECIALLY FOR TWO-WHEELED VEHICLES

The invention relates to a brake member comprising a brake shoe and a shoe support adapted to receive the head of said shoe, this brake member being intended to equip, especially, two-wheeled vehicles. The invention relates also to a brake shoe and a support for such a brake member.

In brake members of this type known hitherto, the introduction of the head of the shoe into support is effected, especially on replacement of the shoe, by force-fitting. This force-fitting operation is difficult to apply and generally necessitates the use of a hammer and/or an anvil. In a similar way, the withdrawal of the head of the shoe from its support is a difficult operation.

It is an object of the present invention to overcome the above-mentioned drawback. It is another object of the invention to provide a brake member constructed so that the operations of fixing to and withdrawal from its support of the brake shoe are easily effected.

Another object of the invention is to provide a brake shoe of the type concerned which enables a higher intensity of braking than that conferred by previously known brake members.

Another object of the invention is to provide such a member whose braking action is relatively little affected by irregularities in the shape of the rim on which the active surface of the brake shoe has to be applied, this braking action remaining considerable even in rainy weather.

It is another object of the invention to provide a support for a brake shoe which can be formed by moulding, especially of plastics material.

The brake member according to the invention comprises connecting means for the support and the shoe which comprise at least one connecting rod, corresponding openings being respectively formed in the head of the shoe and in the support to enable the passage of said connecting rod in these opening. Said openings are, preferably, arranged so that the connecting rod has a direction substantially parallel to the active surface of the brake shoe.

In a preferred embodiment, the shoe comprises at least two separate elements, the support, the connecting rod and said openings being arranged so that said connecting rod passes through the respective heads of the separate elements. In a modification, at least one connecting rod and associated corresponding openings are provided for each of said separate elements.

Other features, characteristics and advantages of the invention will appear also in the course of the detailed description below, with reference to the accompanying drawings, which are to be regarded as in no way limiting, and in which.

Figure 1:
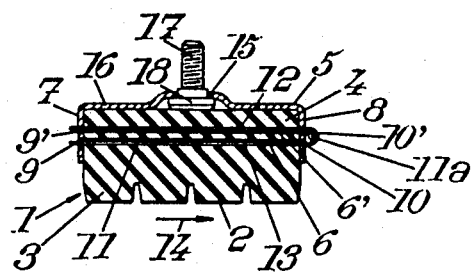
FIG. 1 illustrates, in longitudinal section, one embodiment of a brake member according to the invention.
Figure 2:
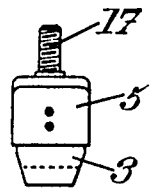
FIG. 2 represents a side view of the embodiment of the brake member shown in FIG. 1.

The brake member shown in FIGS. 1 and 2 comprises, in manner known in itself, a brake shoe 1 comprising an active braking surface 2. This shoe comprises two portions, namely a body 3 of which one surface constitutes the abovesaid active surface 2 and a head 4 intended to be introduced into the support 5.

At least the body 3, on which the active surface 2 occurs, is formed of a material having a high coefficient of friction with respect to the surface on which it must be applied. In the type of application envisaged, this brake member is intended for the braking of a vehicle (not shown) having wheels with associated rims, the active surface 2 being intended to be applied against the associated rim when it is desired to brake or stop said vehicle; such a vehicle is for example a two-wheeled vehicle such as a bicycle. The support 5 is generally metallic.

According to the invention, at least one hole (or opening) 6 is formed in a head 4 of the shoe and the lateral walls 7 and 8 of support 5 are pierced, respectively, by holes 9 and 10 which, when the head 4 is introduced into said support 5, occur facing the ends of the hole 6. In addition, a connecting rod 11 whose length is at least equal to the distance which separates the holes 9 and 10, is introduced into the holes 6, 9 and 10 in order to hold the head 4 in support 5.

It will be noted that with such a method of fixing the shoe to the support, it is easy to arrange said shoe in its support, or reciprocally, to remove it from this support. In fact, it suffices to introduce the head 4 inside of support 5, the dimensions, internal and external respectively, of support 5 and the head 4 being such that the introduction of said head into the support is easily effected. After this operation, it suffices to introduce the connecting rod 11 into corresponding openings 6, 9 and 10; the latter operation can be easily carried out by hand.

For simplicity of production, the connecting rod 11 occurs, preferably, in a plane parallel to the surface 2.

In the example shown, an additional hole 6', parallel to the opening 6, is formed in the head 4 of the shoe; in the same way, corresponding openings 9' and 10' are pierced in the walls 7 and 8. The connecting rod 11 has, in this case, the form of a pin comprising two arms 12 and 13, this pin being performed of a material (such as spring steel) having elastic properties so that the arms 12 and 13 have a tendandy to separate from one another when the arm 12 is introduced into the holes 6, 9 and 10 and the arm 13 into the holes 6', 9' and 10' or reciprocally. To this end, the head 11a of the pin has the shape of a loop. This pin is thus held by itself in said holes. Each arm of the pin has, in the example, a substantially cylindrical section.

In a modification (not shown), the connecting rod 11 is single but its perpendicular cross-section has not a regular shape, the corresponding hole in the head of the shoe having substantially the same cross-section, so that said connecting rod cannot turn freely inside said hole. This irregular cross-sectional shape for the connecting rod is, for example, a square section, the same as for the corresponding opening in the head of the shoe; in this case, the connecting rod is terminated, for example, at least on one side, by a threaded rod ending, when the connecting rod is in position, outside the support, so that a nut can be screwed on said threaded rod.

In the embodiment shown in FIGS. 1 and 2, the support 5 is rigidly fixed to braking control means (not shown) due, on one hand, to an opening formed in the upper walls 16 of the support 5, this wall 16 being that which, normally, occurs opposite the active surface 2 of the shoe 1 and, on the other hand, at a rod 17 terminated by a ferrule 18 of diameter greater than that of the opening 15. This rod 17 is introduced, before the shoe, inside the support 5. As shown, the wall 16 is deformed at the level of the opening 15 so that the ferrule 18 cannot impede the introduction of the head 4 of the shoe into the support 5.

In a modification (not shown), the upper wall 16 of the support 5 is not deformed, that is to say it is of a flat shape, but a flat is formed in the upper portion of the head of the brake shoe, this flat constituting a housing for the ferrule 18.

It is to be noted here that support 5 can be formed by moulding, especially of plastics material. In fact, this support must not, unlike to the supports of the prior art, be deformed or undergo substantial stress on the mounting of the shoe in such support.

Figure 3:
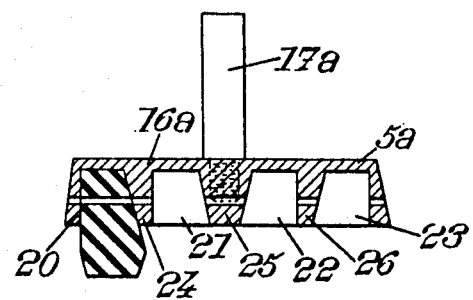
FIG. 3 shows, in longitudinal section, another embodiment of a brake member constructed according to the invention.

FIG. 3 illustrates another embodiment of the braking member according to the invention in which the support 5a is divided into four housings 20, 21, 22 and 23. The housings 20 and 21 are separated by a wall 24, the housings 21 and 22 by a wall 25 and the housings 22 and 23 by a wall 26. Each of these housings is intended to receive the head of a shoe element, only the shoe element in the housing 20 having been shown in FIG. 3. Each housing has an upwardly flared shape, that is to say towards the upper wall 16a so as to facilitate the introduction of the heads of the shoe elements into said housings.

As in the embodiment of the invention shown in FIGS. 1 and 2, each of the heads of the shoe elements comprises two holes (of which a single one is shown in FIG. 3, the other hole being situated in the same plane parallel to the active braking surface) and corresponding openings are formed in the lateral walls of the support and in the separating walls 24, 25 and 26.

The separation of the shoe into several elements enables further improvement of braking efficiency. In fact, if the wheel is distorted or twisted, each shoe element can fulfill its braking role in a better manner than if the shoe was a single one, the position of each shoe element being individually adjustable. In addition, in rainy weather, water reaches in smaller amount the elements in intermediate position.

As in the embodiment of FIGS. 1 and 2, the support 5a can be formed by moulding, especially of plastics material.

The connection between the support and the braking control means is produced, in this case, by means of a rod 17a comprising a threaded end adapted to cooperate with a tapped hole formed in the support 5a. If the support 5a is formed of plastics material by moulding, the end of the rod 17a can be emprisoned on moulding, in the support. In this case, this end must have a shape such that the rod 17a cannot rotate with respect to the support.

Although in the embodiment shown in FIGS. 1 to 3 the braking members only comprise one pin with two arms of longitudinal direction, these braking members could, of course, comprise one or several additional connecting rods. In addition, these connecting rods or pins could have another direction, for example a transverse direction. In this case, it will be necessary to provide at least one connecting rod or pin per shoe element, if the braking member is produced according to the embodiment shown in FIG. 3. Again in the case where the connecting rods or pins have a transverse direction and where the shoe is separated into several elements, the various connecting rods can constitute a single element (not shown) having the shape of a rake or comb, the teeth of this element in the form of a rake constituting said connecting rods rigidly fixed to a transverse member.

The connecting rod 11 between the head and the shoe support can, of course, as already indicated, be produced in various ways; for example, this connecting rod can have a square or rectangular cross-section and be terminated by threaded ends, these ends being intended to terminate outside the support so as to be able to cooperate with nuts so as to hold the rod in position.

The braking member which has just been described is simple and economic to produce. It can be used especially on two-wheeled vehicles.

As is self-evident and as it emerges already from the foregoing, the invention is in no way limited to those of its types of application, nor to those embodiments of its various parts, which have been more especially indicated; it encompasses, on the contrary, all modifications.

I claim:

1. A brake member for a bicycle, said member comprising:
   a shoe support rigidly fixed to brake actuating means, said support having at least two lateral surfaces which are facing each other,
   a brake shoe comprising a head adapted to be introduced into said support so as to be immobilized therein, the active surface of the brake shoe being adapted to be applied against the rim of the wheel equipped with said brake member,
   a generally U-shaped pin comprising two arms,
   each lateral surface of the support comprising two openings bounded by a complete perimeter, the area of each opening being only slightly greater than the cross section of each arm of the pin,
   the head of said shoe including two through-openings which face the corresponding openings of the lateral surfaces for receiving the arms of the pin,
   the length of each arm of the pin being greater than the distance separating the two lateral surfaces and said pin being arranged so that its arms have a tendency to separate from one another when said arms are introduced into the corresponding openings of the head of the shoe.

2. Brake member according to claim 1 wherein said pin is fomed of spring material, and its two arms normally are further apart than the pairs of openings in said lateral surfaces or said head, whereby the spring force constantly urges the stressed arms away from each other when located in said openings, thus tending to hold the pin in said openings.

3. Brake member according to claim 1, wherein the lateral surfaces are substantially perpendicular to the longitudinal direction of said member, the openings passing through the head of the shoe and said openings of the lateral surfaces of the support being arranged so that the connecting rod has a longitudinal direction substantially parallel to the active surface of the brake shoe.

4. Brake member according to claim 1, wherein the cross-sections of said openings of the shoe are substantially equal to that of the arms of the pin.

5. Brake member according to claim 1, wherein the shoe comprises at least two separate elements; the support, the pin and said openings being arranged so that the arms of the pin pass through the respective heads of the separate elements.

6. Braking member according to claim 5 wherein the support comprises separating walls in order to divide the support into housings for receiving the respective heads of said elements.

7. Braking member according to claim 6, wherein the separating walls are arranged so that each of said housings has a flared internal shape, the surface forming the bottom of each housing having a surface area less than that of the opening of said housing through which the head of the corresponding shoe element is adapted to be introduced, said head of this shoe element having a flared outer shape similar to the inner shape of said housing.

* * * * *